Jan. 17, 1928. 1,656,445
A. J. NEUHENGEN
MACHINE FOR FORMING BEADED HOOPS FROM FLAT METAL STRIPS
Filed March 13, 1924 5 Sheets-Sheet 1
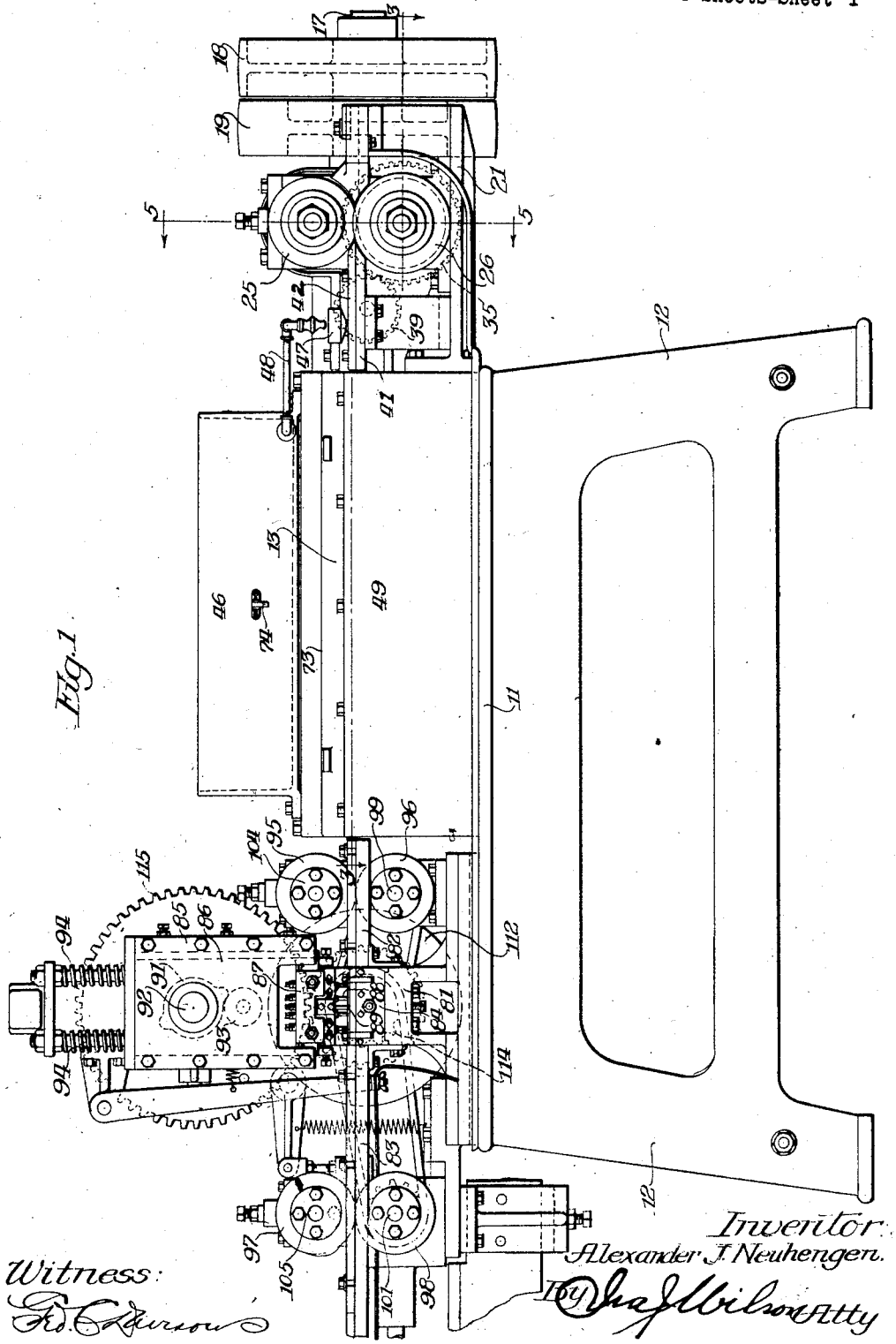
Witness:
Fred C. Larson
Inventor
Alexander J. Neuhengen.
by Ira J. Wilson Atty

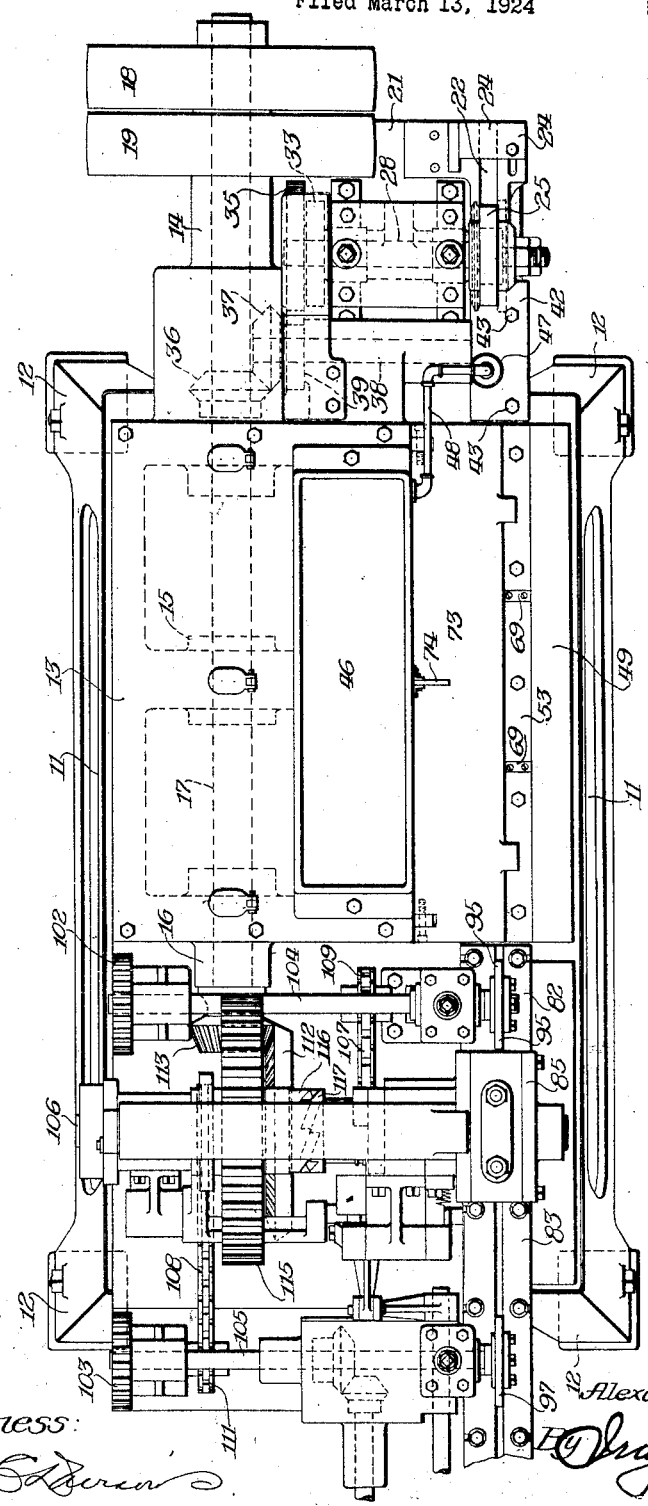

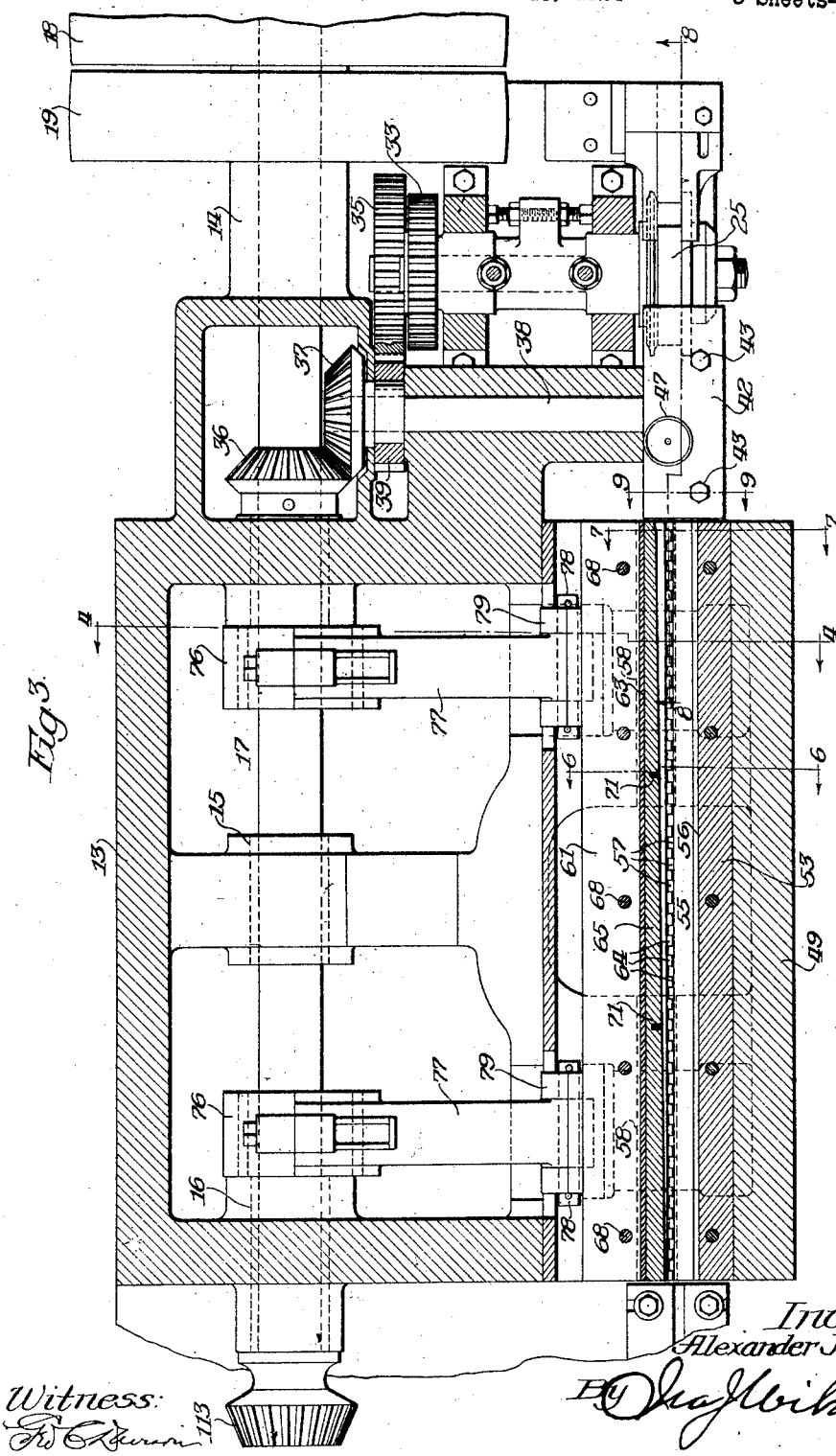

Jan. 17, 1928. 1,656,445
A. J. NEUHENGEN
MACHINE FOR FORMING BEADED HOOPS FROM FLAT METAL STRIPS
Filed March 13, 1924 5 Sheets-Sheet 4
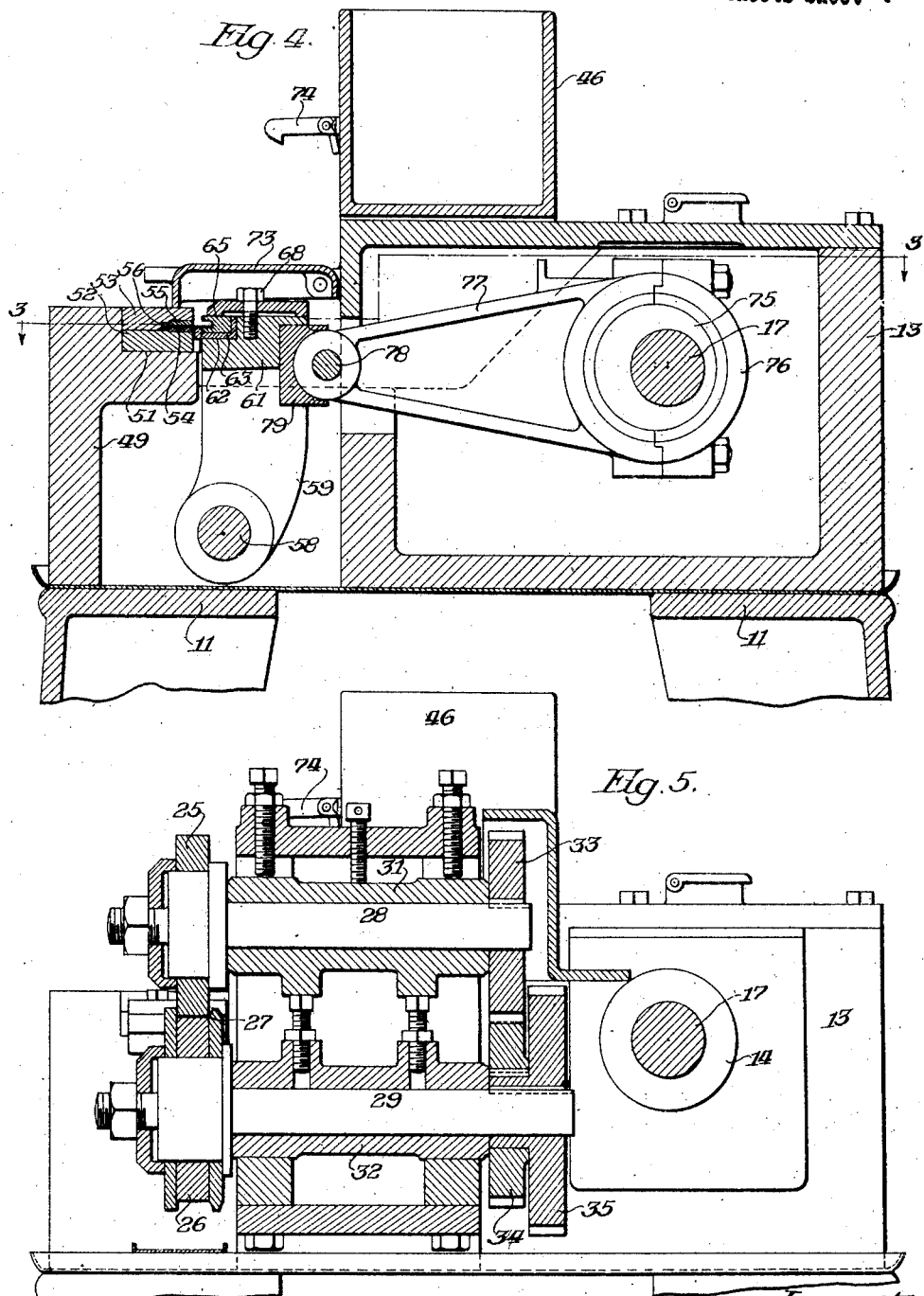

Jan. 17, 1928.

A. J. NEUHENGEN 1,656,445

MACHINE FOR FORMING BEADED HOOPS FROM FLAT METAL STRIPS

Filed March 13, 1924  5 Sheets-Sheet 5

Witness:

Inventor:
Alexander J. Neuhengen.
Atty.

Patented Jan. 17, 1928.

1,656,445

UNITED STATES PATENT OFFICE.

ALEXANDER J. NEUHENGEN, OF CHICAGO, ILLINOIS.

MACHINE FOR FORMING BEADED HOOPS FROM FLAT METAL STRIPS.

Application filed March 13, 1924. Serial No. 698,858.

This invention relates in general to metal working machines, and has more particular reference to a machine for converting metal strips into beaded barrel hoops.

In the manufacture of beaded barrel hoops, it has heretofore been the practice to pass long flat metal strips through a machine wherein each strip is cut into suitable lengths to form the hoops and the ends of each strip are simultaneously punched to form rivet holes. A typical example of a cutting and punching machine is shown and described in my prior Patent No. 1,482,025, granted January 29, 1924. From the cutting and punching machine the strips are discharged upon the floor and are then picked up by hand and carried to a beading machine such, for example, as is illustrated in United States Patent No. 1,239,437, granted September 4, 1917.

This process of manufacture through the agency of two independent machines, one of which cuts a strip into suitable lengths for individual hoops and simultaneously punches rivet holes in the ends of the several lengths and the other of which beads such strip, involves not only the use of two separate machines but considerable loss of time and labor in transferring the strips from the cutting and punching machine to the beading machine. Furthermore, the handling of the cut lengths results in considerable loss and wastage because many of the strips become bent and distorted in handling.

One object of my present invention is to reduce the manual labor and the wastage involved in this method of manufacture by providing a single unitary machine in which the bead may be formed on a continuous length of strip, and the latter cut into suitable lengths and punched, all in one pass of the stock through the machine. By this, not only is the time and labor of transfer of the stock between separate machines and also the resultant wastage avoided, but by combining the beading and cutting and punching mechanisms in a single machine, a considerable economy of structural and operating parts is effected.

Another object of the invention, which relates to the mechanism for forming the bead, is to provide an improved mechanism for actuating the beading die which gives to the latter a movement better adapted to the formation of the bead than has heretofore been attained. In the beading machine of the Glader Patent No. 1,239,437, above referred to, the beading die is reciprocated by a rectilinear movement in a path parallel with the flat sides of the metal strip and progressively subjects each portion of the edge upon which the bead is formed to the action of successively different portions of the die. My present invention contemplates the use of a beading die the operative concave face of which is of gradually decreasing depth from end to end of the die, as in the Letters Patent to Glader aforesaid; but, instead of reciprocating the die in a rectilinear movement in a path parallel with the flat sides of the metal strip, I give to the die an oscillating movement in an arcuate path which, by first exerting an upward and inward thrust and then a downward and inward thrust upon the edge of the metal strip forms a more perfect bead by causing the die itself to more nearly follow the progressive movement of the metal during the formation of the bead, and making it easier on the machine and dies to form a closed or tight bead on hoop steel.

Another object of the invention is to provide an improved construction that will insure a support beneath the strip while the bead is being formed, so as to prevent the steel strip from breaking or bending downwardly or in the wrong direction.

A further object of the invention is to provide improved means for preventing the strip from following the die on the backward or return movement of the latter or getting out of the guides as it is entering and leaving the machine.

Other objects and attendant advantages of my present invention will be readily understood and appreciated by persons skilled in the art as the same becomes better understood by reference to the following description, taken in connection with the accompanying drawings wherein I have illustrated one practical working embodiment of the principle of the invention, and in which—

Figure 1 is a side elevation of the machine;

Fig. 2 is a top plan view;

Fig. 3 is a horizontal section taken in the plane of the line 3—3 of Figs. 1 and 4;

Fig. 4 is an enlarged vertical section taken on the line 4—4 of Fig. 3;

Fig. 5 is an enlarged vertical section through the feeding and crimping rolls and their bearings, on the line 5—5 of Fig. 1;

Figure 6:
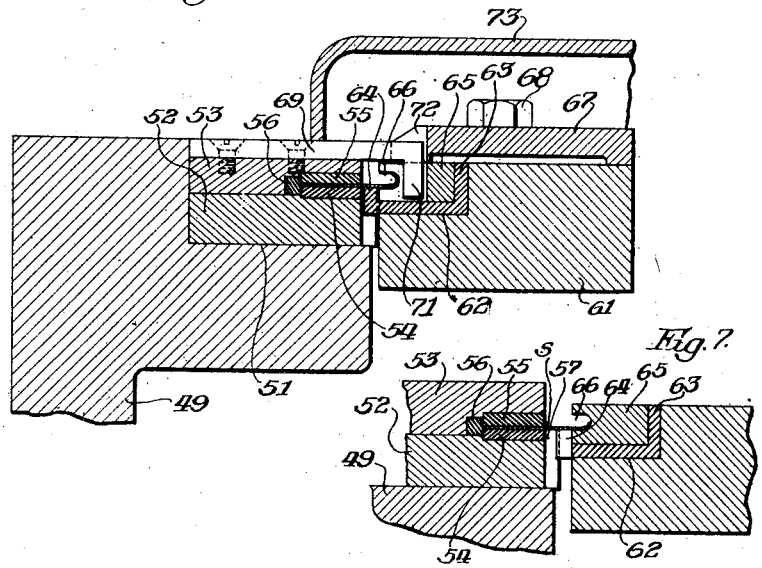
Fig. 6 is a further enlarged sectional detail on the line 6—6 of Fig. 3.

Referring to the drawings, 11 designates generally the machine frame or bed, which may be of any suitable size to accommodate the operating mechanisms hereinafter described, and is supported upon legs or pedestals 12 or in any other convenient manner. On the bed 11 is mounted a generally box-like structure, designated as an entirety by 13 and constituting a housing or support for the bead-forming mechanism and its operating devices. Journaled in suitable bearings 14, 15 and 16 carried by the box structure 13 is a power shaft 17 equipped at its rear end with the ordinary fast and loose pulleys 18 and 19, through which power is transmitted to the shaft from any suitable source.

Figure 8:
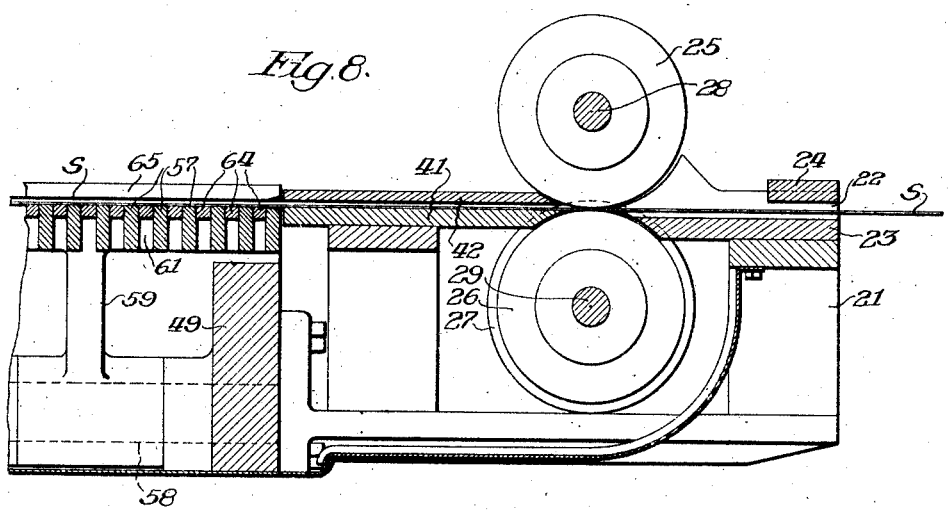
Fig. 8 is an enlarged longitudinal section through the feeding and crimping rolls and a portion of the bead-forming mechanism taken in the plane of the line 8—8 of Fig. 3.

On a bracket 21 attached to the rear end of the box frame 13 is mounted a mechanism by which the metal strip or tape is fed into the bead-forming mechanism and one edge thereof is crimped or bent upwardly whereby to facilitate the subsequent action thereon of the bead-forming die. This feeding and crimping mechanism, as to its main features, includes an entrance slot or guideway 22 (Fig. 8) formed in a plate 23 mounted on the rear end of the bracket 21, said slot being closed at its top by a cross strip 24. The slot 22 conducts the strip, designated by S, into the nip of the feeding and crimping rolls 25 and 26 (Figs. 5 and 8). The lower roll 26 has a peripheral groove slightly less in width than the strip and inclined at one side as shown at 27 in Fig. 5, and the upper companion roll 25 travels in the peripheral groove of the roll 26 so that, as the strip S passes between the rolls it is slightly bent upwardly at one edge by the inclined wall 27 of the groove of roll 26. Rolls 25 and 26 are fixedly mounted upon shafts 28 and 29, respectively, journaled in bearing members 31 and 32, respectively, and on the other ends of the shafts 28 and 29 are intermeshing spur gears 33 and 34, respectively, by which the upper shaft 28 is driven from the lower shaft 29 at the same speed and in an opposite direction; shaft 29 being equipped with a spur gear 35 driven from main shaft 17 through the gear train clearly shown in Fig. 3 and comprising a bevel gear 36 on the power shaft 17, a mating bevel gear 37 on a cross shaft 38, and a spur gear 39 on the shaft 38 meshing with and driving the gear 35.

The bearing members 31 and 32 are so mounted as to be adjustable toward and from each other by the devices clearly shown in Fig. 5. This feeding and crimping mechanism herein shown is identical in all substantial respects with the corresponding mechanism disclosed in the Glader Patent No. 1,239,437, above referred to, and particularly Figs. 4 and 4[A] thereof, to which reference may be had for a more detailed description.

Figure 9:
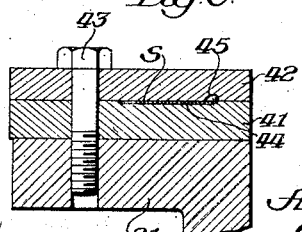
Fig. 9 is a sectional detail through the portion of the strip feedway or guide, taken on the line 9—9 of Fig. 3.

Mounted on the bracket 21 between the feeding and crimping rolls and the bead-forming mechanism is a guide for the strip, herein shown as comprising lower and upper flat bars 41 and 42 secured to each other and to the bracket 21 by machine screws 43. In the upper surface of the lower bar 41 is formed a shallow channel 44 (Fig. 9) corresponding in width to the crimped strip, and in the under surface of the upper guide bar 42 is formed a narrow groove 45 of sufficient width and depth to accommodate the upwardly crimped margin of the strip. To facilitate the passage of the strip through this guide channel as well as through the mechanisms which later operate on the strip, the machine is preferably equipped with a provision for supplying lubricant to the strip at this point; the same comprising an oil tank 46 mounted on the box 13, an oil cup 47 mounted in the guide bar 42 and communicating through the latter with the channel 44, and an oil flow pipe 48 leading from the tank 46 to the cup 47.

From the guideway last described the strip enters and passes through the mechanism by which a substantially circular bead is formed on the crimped edge thereof. This bead-forming mechanism, as to its main features, comprises a guide groove or channel somewhat narrower than the strip and only sufficiently thicker than the latter to permit the lubricated strip to be easily drawn therethrough, and a die block or bar formed with a concave operating face of gradually varying depth from end to end moving toward and from the crimped edge of the strip which overhangs the guide channel. The specific form of the operating face of this die bar is the same as that disclosed in the Glader Patent No. 1,239,437, above referred to, and particularly Fig. 9 thereof; but in the aforesaid patent the die bar is reciprocated in a rectilinear path of movement toward and from the edge of the strip, the latter being advanced a slight distance between successive strokes of the die so as to gradually curl the edge over in the formation of the bead. The die actuating means of my present invention differs radically from that of the said Glader patent, in that the die member is given an oscillating movement on an arcuate path of travel, by which the bead is more easily and more perfectly formed, as will be hereinafter more particularly described.

Describing the bead-forming mechanism in detail, and referring to Figs. 3, 4, 6 and 7, mounted on the bed 11 at the front of the machine, and extending parallel with and in front of the box structure 13, is a smaller box frame 49 that constitutes a support for the parts forming the strip-guiding groove or channel. The upper inner edge of the front wall of the frame 49 is rectangularly countersunk, as shown at 51, to form a seat for a pair of lower and upper bars 52 and 53, the meeting faces of which are longitudinally recessed or channeled to receive between them a pair of lower and upper steel plates 54 and 55 that are suitably secured to the bars 52 and 53, respectively, and are spaced apart sufficiently to form a guide channel for the strip operated upon. Opposite the rear edges of the plates 54 and 55 is preferably inserted a steel strip 56 that forms an inner edge wall of the channel and receives the edge thrust of the strip in the channel when the latter is subjected to the pressure of the die. The lower plate 54 which forms the bottom wall of the strip-guiding channel is formed on its outer edge with a row of rectangular comb-like fingers 57, most clearly shown in Fig. 7 that project beyond the vertical plane of the corresponding edge of the upper plate 55. These fingers 57 are also shown in the sectional plan Fig. 3 and vertical section Fig. 8.

Journaled in and between the end walls of the box frame 49 is a rock-shaft 58, fast on which are a pair of upstanding arms 59 joined at their upper ends by a heavy crossbar 61, the upper corner of which latter adjacent to the strip guide is rectangularly countersunk as shown at 62 to seat an angle strip 63 suitably secured therein. The outer edge of the horizontal limb of the angle strip 63 is, like the guide channel strip 54, formed with rectangular comb-like vertical fingers 64 (Figs. 3, 6, 7 and 8), which lie directly opposite the spaces between the fingers 57 of the channel bar 54 and, in the closed position of the die, shown in Figs. 4 and 6, fully occupy said spaces. Seated in the angle strip 63 is the die 65, which comprises a bar of hardened steel provided with a longitudinally extending bead-forming groove or slot 66 in its front face, which groove is of maximum depth at its receiving or right-hand end, viewing Fig. 3, and gradually diminishes in depth to, or nearly to, its other end, as shown in Fig. 3. In the operation of the machine, the die performs several successive operations upon a given length of strip passing the die, so that short portions of said strip are successively and gradually curled over into the form of a bead between the receiving and the discharge end of the die itself, all as more particularly described in the Glader patent referred to, to which reference may be had for a more detailed description of the structure of this die and its manner of operation on the strip. The die bar 65 is held in place by an overlying clamp plate 67 detachably secured to the cross-bar 61 as by machine screws 68.

Figure 7:
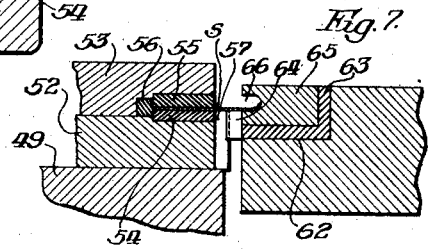
Fig. 7 is a view similar to Fig. 6 on the line 7—7 of Fig. 3, but showing the bead-forming die at its rearmost postion.

Fig. 7 shows the die in its fully retracted position, from which it will be seen that the fingers 64 are retracted from between the co-operating fingers 57 so as to form an auxiliary support for the strip operated upon toward its crimped edge; the fingers 64 thus additionally supporting the strip while the bead is being formed, and preventing it from breaking downwardly or in the wrong direction.

Attached to and crosswise of the bar 53 are a pair of strips 69 which overhang the open edge of the strip guide toward the die and are provided on their free ends with depending fingers 71, clearly shown in Fig. 6; to accommodate which fingers, the die 65 and its clamp plate 67 are vertically slotted, as shown at 72. These fingers 71 perform an important function in preventing the strip operated upon from following the die on the return or backward movement of the latter, or getting out of the guide channel as it is entering and leaving the machine. As a safety factor, and to keep the guide channel and die clear of dust and dirt, I preferably provide a lid or cover 73 (Figs. 2 and 4) that is hinged at its rear edge to lugs on the box frame 13 and can be swung upwardly and held open by a hook 74 on the front face of the oil tank 46.

The die and its carrier is oscillated from the main drive shaft 17 by the mechanism clearly shown in Figs. 3 and 4, comprising eccentrics 75, eccentric straps 76, and eccentric arms 77 pivoted at their forward ends on pins 78 mounted in forked bearing blocks 79 that are set into and secured to the die carrying yoke bar 61. It will be seen that the relation of the die carrier to its operating mechanism is such that a very powerful thrust is imparted to the die on each inwardly swinging movement of the latter.

Mounted on the bed beyond the bead-forming mechanism last described is the strip cutting and punching mechanism. This mechanism in all substantial respects is identical with the corresponding mechanism fully described and shown in, and forming the subject-matter of, my former Patent No. 1,482,025, above referred to; and for a full and detailed description of said mechanism reference may be had to the specification and drawings of said patent. Hence, I will herein only briefly point out the principal operating parts of said mechanism, and the means through which said parts are driven from the main power or drive shaft 17 of the machine.

A pedestal 81 stepped on the bed 11 supports on opposite sides thereof long narrow tables 82 and 83 in and through which are formed guide channels for the beaded strip, and also an anvil block 84. Guided in a frame 85 above the anvil block is a reciprocating slide 86 carrying at its lower end a head 87 in which are mounted a group of punches 88 and, centrally between said punches, a cutter blade 89, by which the strip is severed, and the severed ends simultaneously punched to form rivet holes. The head 87 is forced downwardly by a cam 91 fast on a shaft 92 operating on a cam roller 93 on the slide 86, and it is returned by a pair of springs 94. Co-operating with the strip guide 82 are a pair of advancing rolls 95 and 96, the peripheries of which enter the channel of the guide and grip the strip between them to pass the latter over the anvil 84. On the other side of the anvil are a similar pair of advancing rolls 97 and 98, similarly engaged with the channel of the guide table 83 for transferring the severed strip inwardly to the delivery end of the machine. The lower rolls 96 and 98 are mounted on one end of shafts 99 and 101, respectively that are suitably journaled transversely of the machine and are equipped on the other end thereof with spur gears (not shown) which mesh with and drive spur gears 102 and 103 (Fig. 2) on the corresponding ends of similar shafts 104 and 105 on which the upper rolls 95 and 97 are mounted. Between and parallel with the two series of roll shafts is a shaft 106 on which are sprockets (not shown) connected by sprocket chains 107 and 108 to sprockets 109 and 111 fast on the shafts 99 and 101, respectively. Also fast on the shaft 106 is a bevel gear 112 meshing with a driven by a bevel pinion 113 fast on the inner end of the main drive shaft 17. By the gearing described the advancing rolls are continuously driven; and when the travel of the strip operated upon is instantaneously arrested by the gripping action of the die thereon, the advancing rolls slip idly on the arrested strip, but continue the advance of the latter the instant the grip of the die is released. Also fast on the shaft 106 is a spur gear 114 (Fig. 1) that meshes with and drives a spur gear 115 loose on the shaft 92. On one face of the spur gear 115 is a clutch member 116 adapted, at the proper intervals for the actuation of the punches and cutter, to be engaged with a mating clutch member 117 splined on the shaft 92. Through suitable timing mechanism, not herein shown but fully disclosed in my former patent above referred to, the clutch members are engaged to effect the cutting of the strip in uniform lengths and the simultaneous punching of the severed ends.

Beyond the advancing rolls 97 and 98 the machine is equipped with automatically operated stop finger mechanism intersecting the guide channel for momentarily interrupting the advance of the stock when a predetermined length has been fed through the machine, which stop mechanism also automatically throws in the clutch 117 through which the cutter and punches are actuated, and also with a pair of delivery rolls, similar to the advancing rolls, but actuated at a higher speed, for throwing out the finished strips. As these devices are fully disclosed in my former patent above referred to and form no part of my present invention, I have not extended the illustration herein to include them.

From the foregoing it will be apparent that my present invention embraces in a single organized machine successively acting mechanisms which operate to first feed in and crimp a continuous strip of steel or other metal, then to form a bead on one edge thereof, and then to sever the strip into uniform lengths and simultaneously punch rivet holes in the severed ends; the several mechanisms being associated in immediate succession and all operated in properly timed relation from a single power shaft mounted in the machine frame. By the use of this machine, therefore, it is possible to produce fully fabricated hoop strips from a continuous length of band steel passed continuously into the receiving end of the machine. Manifestly this eliminates the labor and loss of time of transferring partly fabricated strips from one machine to another, and also reduces the number of parts and the space occupied as compared with separate individual machines for performing the several described operations.

With reference to the described bead-forming mechanism, I have found in practice that, by giving to the beading die an arcuate movement on a horizontal pivot of oscillation, and locating the axis of this pivot substantially in the vertical plane of the free edge of the strip to be beaded, I am able to impart to the edge as it is curled and beaded first a slight upward and inward travel and then, in the last half of the stroke, a slight inward and downward travel, by which a more perfect circular bead can be formed than when the die is given a plain rectilinear movement in a plane and a path parallel with the flat sides of the metal strip. The strip supporting fingers beneath and moving with the die are also important because suppporting the edge of the strip operated upon by the die during the bead-forming operation against any possibility of bending or breaking in the wrong direction; and the safety fingers which overhang the strip in its travel to the die mechanism are also important in preventing any possibility of the strip being pulled edgewise out of the guide channel under frictional drag of the die thereon.

While I have shown and described a preferred embodiment of the invention, it should be understood that the details of construction are capable of wide modification and variation without departing from the spirit of the invention or sacrificing any of the advantages thereof. Hence, I reserve all such variations and modifications and mechanical equivalents as fall within the spirit and purview of the appended claims.

I claim—

1. In a beading machine, the combination with a guide for the strip to be beaded formed with a channel open on one side, of a die and means for actuating said die toward and from the open side of said channel, and fingers moving with and projecting beyond the working face of said die, said fingers underlying and serving to support the portion of the strip projecting beyond the open side of said guide channel during the working stroke of said die.

2. In a beading machine, the combination with a guide for the strip to be beaded formed with a channel open on one side, of a die and means for moving the same toward and from the open side of said channel, and projecting fingers on the side of said guide toward said die underlying and supporting the portion of the strip projecting beyond the open side of said guide channel.

3. In a beading machine, the combination with a guide for the strip to be beaded formed with a channel open on one side, of a die and means for moving the same toward and from the open side of said channel, and complementary means associated with said guide and die respectively and disposed forwardly of their opposed faces underlying and serving to support the portion of the strip projecting beyond the open side of said guide channel.

4. In a beading machine, the combination with a guide for the strip to be beaded formed with a channel open on one side, of a die and means for moving the same toward and from the open side of said channel, and two groups of interfitting fingers associated with said guide and die respectively and projecting forwardly of their opposed faces, said fingers underlying and serving to support the portion of the strip projecting beyond the open side of said guide channel.

5. In a beading machine, the combination with a guide for the strip to be beaded formed with a channel open on one side, of a die carrier pivoted on an axis parallel with said guide, a die bar mounted on said carrier opposite to and parallel with said guide, fingers on said carrier projecting forwardly of the working face of said die bar and underlying and supporting the portion of the strip projecting beyond the open side of said guide channel during the working stroke of said die bar, and means for oscillating said die carrier.

6. In a beading machine, the combination with a guide for the strip to be beaded formed with a channel open on one side, of a die carrier pivoted on an axis parallel with said guide, a die bar mounted on said carrier opposite to and parallel with said guide, fingers on said carrier projecting forwardly of the working face of said die bar, complementary fingers on said guide interfitting with the fingers on said carrier, both sets of fingers underlying and serving to support the portion of the strip projecting beyond the open side of said guide channel, and means for oscillating said die carrier.

7. In a beading machine, the combination of a guide for the strip to be beaded formed with a channel open on one side, through which channel the strip is drawn, a beading die movable toward and from the open side of said channel, and means on said guide preventing the strip from being displaced edgewise from said guide channel by the die on the retreating movements of the latter.

8. In a beading machine, the combination of a guide for the strip to be beaded formed with a channel open on one side, through which channel the strip is drawn, a beading die movable toward and from the open side of said channel, and means mounted on said guide and engaged with the edge of the strip operated on by the die whereby to prevent lateral displacement of said strip from said guide channel during its passage through the latter.

9. In a beading machine, the combination of a guide for the strip to be beaded formed with a channel open on one side, through which channel the strip is drawn, a die bar movable toward and from the open side of said channel, said die bar formed with a transverse slot intersecting its working face, and an arm attached to said guide and formed with a finger engaged in the slot of said die bar to hold said strip against edgewise displacement under the backward movement of said die bar.

10. In a beading machine, the combination with a fixed guide channel for the passage of the strip to be beaded, said channel being open on one side, of a die carrier comprising a rock-shaft beneath and parallel with said guide, upstanding arms on said rock-shaft, a bar supported by said arms, a die mounted on said bar opposite the open side of said channel, and means for oscillating said die carrier.

ALEXANDER J. NEUHENGEN.